United States Patent
Hermansson

(10) Patent No.: US 8,806,980 B2
(45) Date of Patent: Aug. 19, 2014

(54) KNOB ASSEMBLY

(75) Inventor: Bengt Hermansson, Mullsjö (SE)

(73) Assignee: Kongsberg Automotive AB, Mullsjo (SE)

( * ) Notice: Subject to any disclaimer, the term of this patent is extended or adjusted under 35 U.S.C. 154(b) by 114 days.

(21) Appl. No.: 13/619,479

(22) Filed: Sep. 14, 2012

(65) Prior Publication Data

US 2013/0061712 A1    Mar. 14, 2013

(30) Foreign Application Priority Data

Sep. 14, 2011   (EP) .................................... 11181295

(51) Int. Cl.
| | |
|---|---|
| *G05G 1/00* | (2008.04) |
| *B25G 3/00* | (2006.01) |
| *B25G 3/32* | (2006.01) |

(52) U.S. Cl.
USPC ........... 74/548; 403/350; 16/422; 16/DIG. 24

(58) Field of Classification Search
CPC ......... F16H 59/0278; G05G 1/06; G05G 1/12
USPC ............. 74/473.3, 525, 543, 548, 551.9, 553, 74/558.5; 16/422, 426, 429, 441, DIG. 24, 16/DIG. 25, DIG. 41; 403/350, 351, 352, 403/365, 366, 367, DIG. 4
IPC ................................................ G05G 1/06, 1/12
See application file for complete search history.

(56) References Cited

U.S. PATENT DOCUMENTS

| | | | | |
|---|---|---|---|---|
| 2,100,642 | A | | 11/1937 | Geyer |
| 3,482,889 | A | * | 12/1969 | Cochran .................... 175/325.5 |
| 4,105,346 | A | * | 8/1978 | Gelinas ........................ 403/104 |
| 4,238,164 | A | * | 12/1980 | Mazzolla ................... 403/109.5 |
| 4,569,246 | A | | 2/1986 | Katayama et al. |
| 4,791,826 | A | | 12/1988 | Behrens |
| 5,189,925 | A | | 3/1993 | Neal et al. |

(Continued)

FOREIGN PATENT DOCUMENTS

| | | |
|---|---|---|
| DE | 10061303 A1 | 6/2002 |
| DE | 10232801 A1 | 2/2004 |

(Continued)

OTHER PUBLICATIONS

English language abstract for DE 10061303 extracted from the espacenet.com database on Feb. 14, 2013, 2 pages.

(Continued)

*Primary Examiner* — Thomas R Hannon
*Assistant Examiner* — Adam D Rogers
(74) *Attorney, Agent, or Firm* — Howard & Howard Attorneys PLLC

(57) ABSTRACT

The present invention relates to a knob assembly adapted to be secured to a top portion of a shaft (4) of a gearshift lever, the knob assembly comprising a knob (2) having a generally cylindrical bore adapted to fit over an end portion of the shaft (4), the knob assembly further having engaging members (6) connected to the knob and adapted to engage the shaft for securing the knob on the shaft (4), wherein the knob assembly is provided with at least two engaging members (6), a locking ring (30), and a compression ring (20).

19 Claims, 8 Drawing Sheets

(56) References Cited

U.S. PATENT DOCUMENTS

| | | | |
|---|---|---|---|
| 5,588,329 | A | 12/1996 | Nedachi |
| 6,058,797 | A | 5/2000 | Konig et al. |
| 6,168,343 | B1 | 1/2001 | Botella et al. |
| 6,783,297 | B2 | 8/2004 | Hashimoto et al. |
| 2014/0033857 | A1* | 2/2014 | Currier et al. .................. 74/553 |

FOREIGN PATENT DOCUMENTS

| | | |
|---|---|---|
| EP | 2092404 B1 | 8/2010 |
| JP | 09-006452 A | 1/1997 |
| JP | 2000-185572 A | 7/2000 |
| JP | 2000-203296 A | 7/2000 |
| JP | 2009-280052 A | 12/2009 |
| KR | 100534856 B1 | 12/2005 |

OTHER PUBLICATIONS

Machine-assisted English language translation for DE 10061303 extracted from the espacenet.com database on Feb. 14, 2013, 10 pages.

English language abstract for DE 10232801 extracted from the espacenet.com database on Feb. 14, 2013, 2 pages.

Machine-assisted English language translation for DE 10232801 extracted from the espacenet.com database on Feb. 14, 2013, 6 pages.

English language abstract for EP 2092404 extracted from the espacenet.com database on Feb. 14, 2013, 2 pages.

Machine-assisted English language translation for EP 2092404 extracted from the espacenet.com database on Feb. 14, 2013, 6 pages.

English language abstract for JP 09-006452 extracted from the PAJ database on Feb. 14, 2013, 1 page.

Machine-assisted English translation for JP 09-006452 extracted from the PAJ database on Feb. 14, 2013, 19 pages.

English language abstract for JP 2000-185572 extracted from the PAJ database on Feb. 14, 2013, 1 page.

Machine-assisted English translation for JP 2000-185572 extracted from the PAJ database on Feb. 14, 2013, 18 pages.

English language abstract for JP 2000-203296 extracted from the PAJ database on Feb. 14, 2013, 1 page.

Machine-Assisted English language translation for JP 2000-203296 extracted from the PAJ database on Feb. 14, 2013, 20 pages.

English language abstract for JP 2009-280052 extracted from the PAJ database on Feb. 14, 2013, 1 page.

Machine-assisted English language translation for JP 2009-280052 extracted from the PAJ database on Feb. 14, 2013, 27 pages.

European Search Report for Application No. EP 11 18 1295 dated Feb. 16, 2012, 2 pages.

* cited by examiner

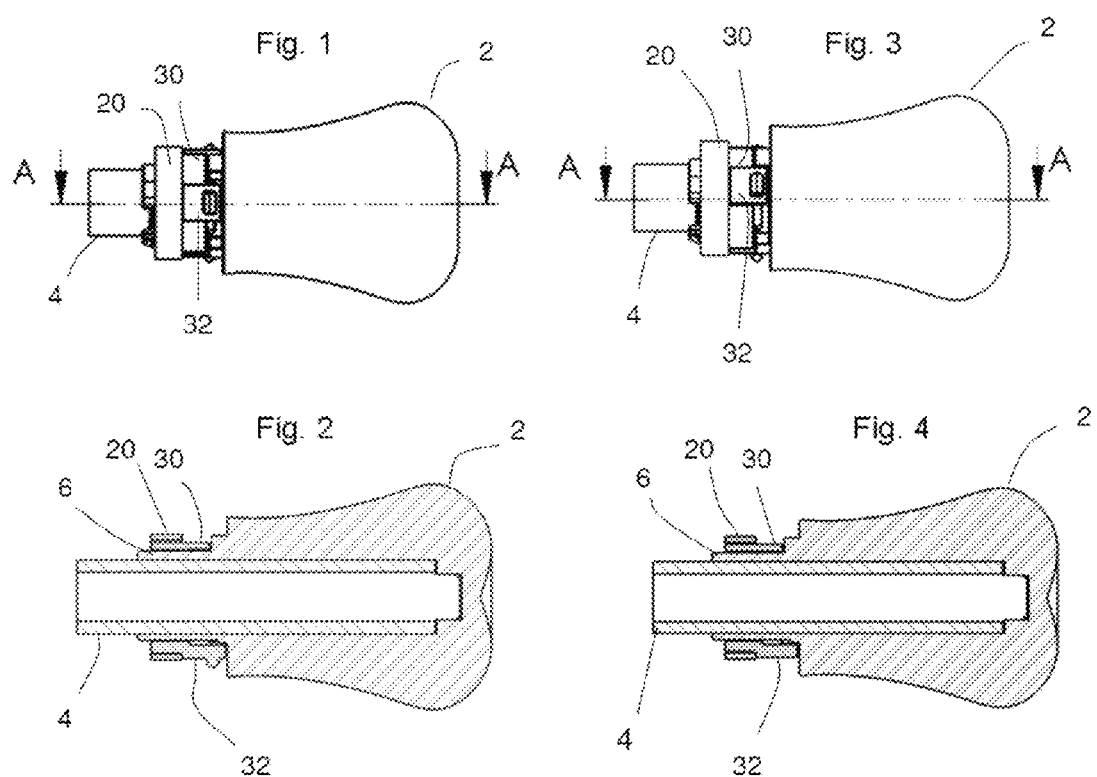

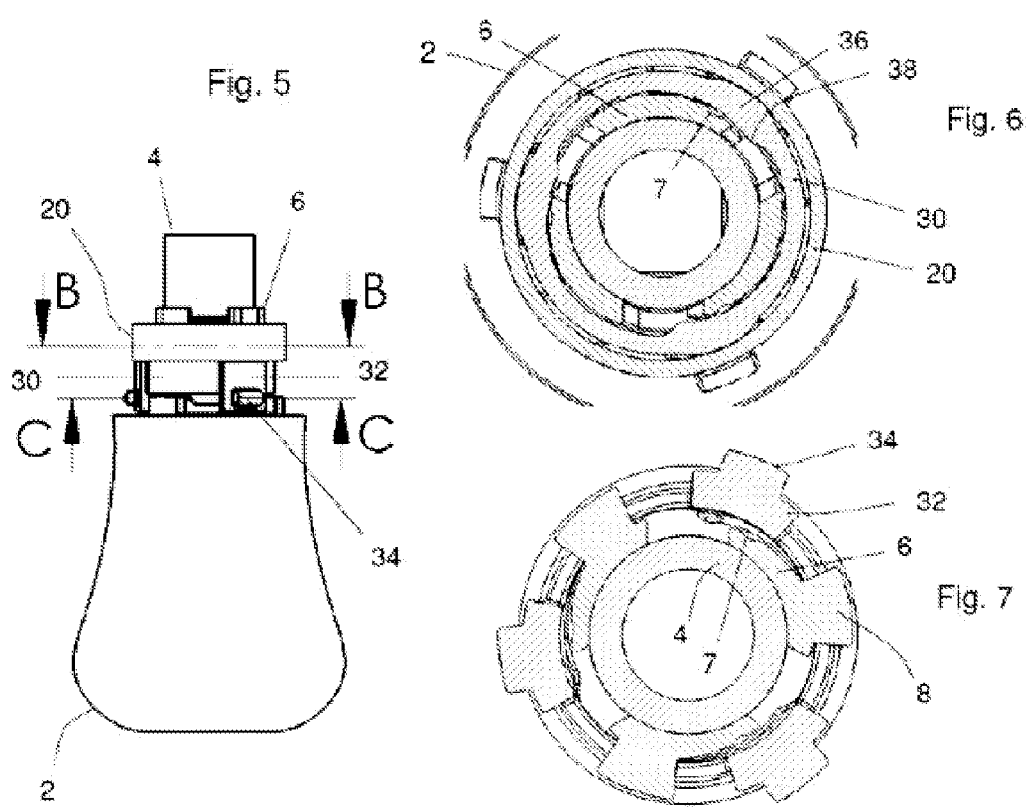

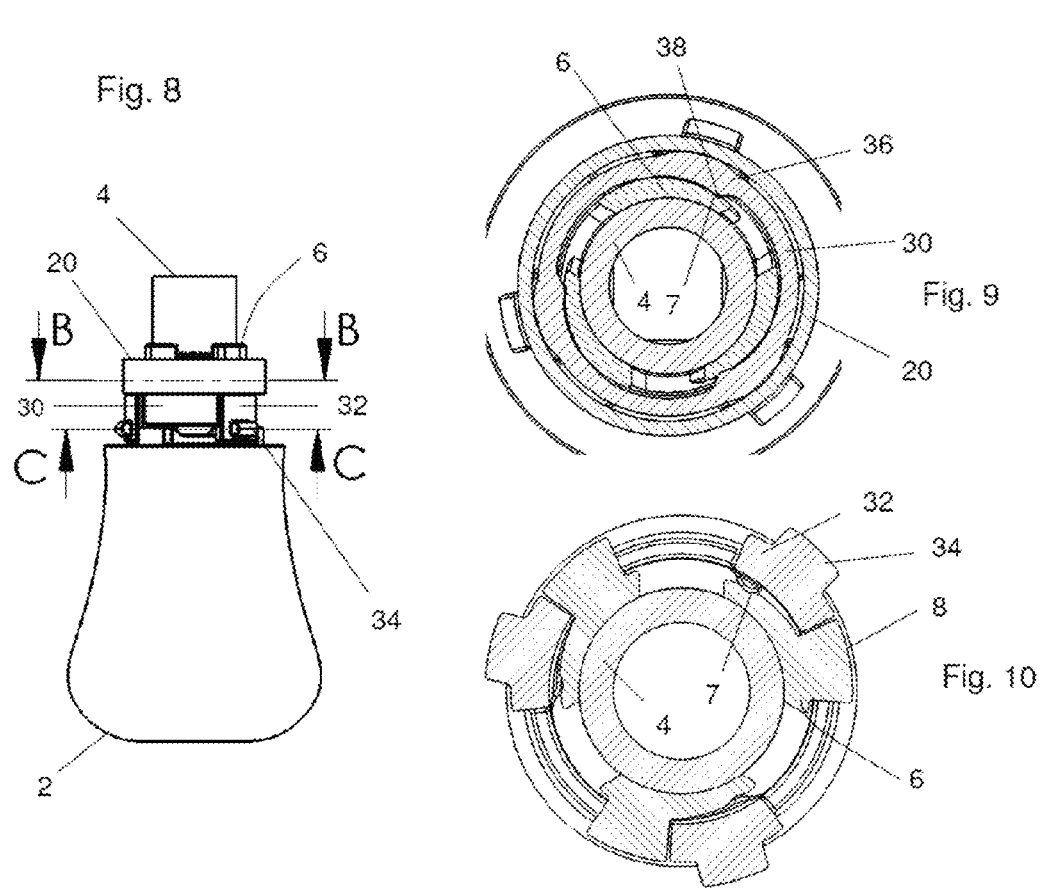

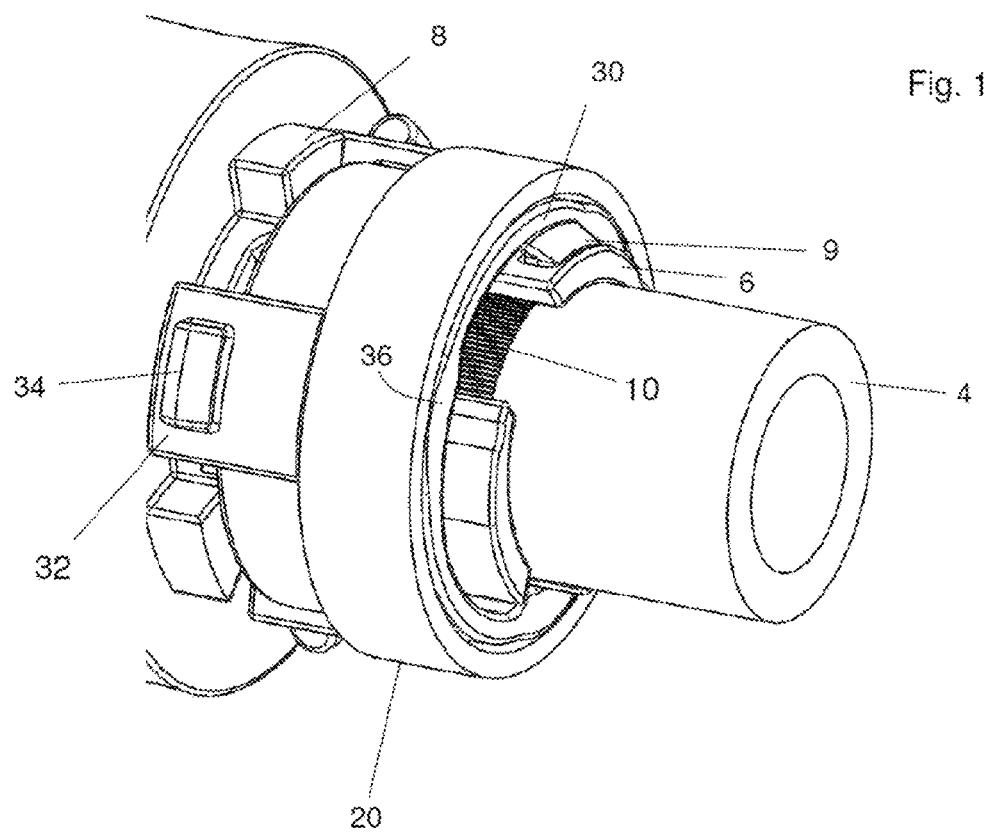

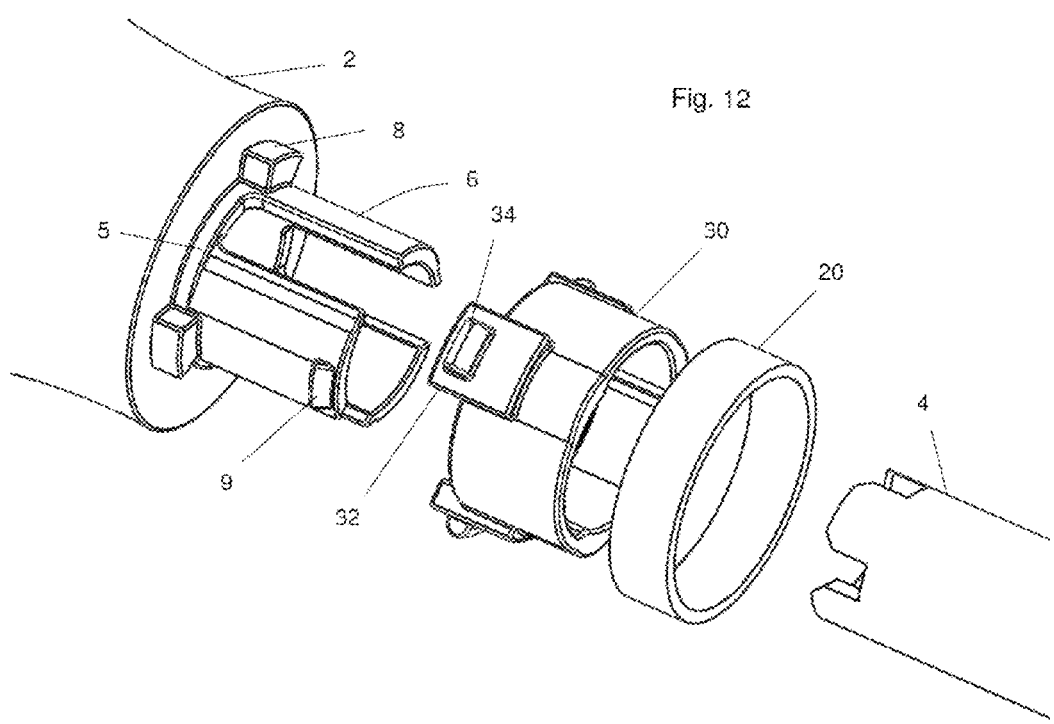

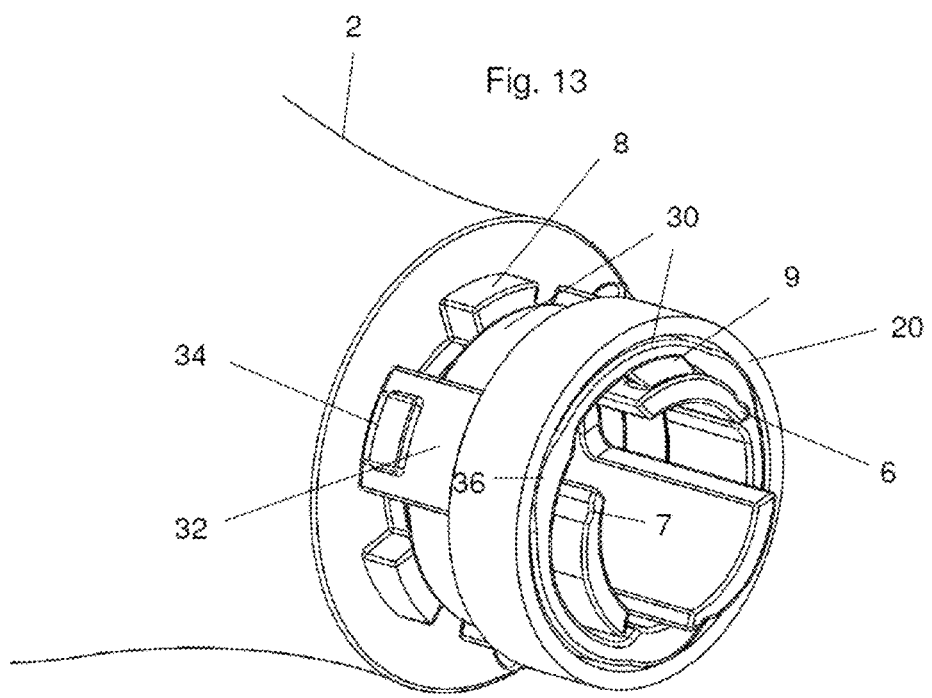

KNOB ASSEMBLY

CROSS-REFERENCE TO RELATED APPLICATIONS

The subject patent application claims priority to and all the benefits of European Patent Application No. EP11181295, which was filed on Sep. 14, 2011 with the European Patent Office, the disclosure of which is hereby incorporated by reference.

FIELD OF THE INVENTION

The present invention relates to a knob assembly adapted to be secured to a top portion of a shaft of a gearshift lever, the knob assembly comprising a knob having a generally cylindrical bore adapted to fit over an end portion of the shaft, the knob assembly further having engaging members connected to the knob and adapted to engage the shaft for securing the knob on the shaft.

A knob assembly of this kind is disclosed in U.S. Pat. No. 6,058,797 B1. The knob assembly comprises a decorative knob including a cylindrical core having a generally cylindrical bore. The bore is adapted for receiving a top end portion of a shaft or an extension member of the shaft. The core further has engagement members in the form of cantilevered tabs which are formed in the wall of the core portion close to its end near the receiving opening for the shaft. The tabs are flexible and extend to distal ends. A first bead extends around the circumference of the outer surface of the shaft, and a second bead is disposed at the distal ends of the tabs for snapping over the first bead on the shaft to thereby secure the knob assembly on the shaft of the gearshift lever. Such a knob assembly is disadvantageous in that flexible tabs are used as engagement members to form a snap-in connection since such flexible tabs are susceptible to breaking. Furthermore, the connection requires that a ring structure is formed close to the upper end portion of the shaft as a counter part for the tabs to form the snap-in connection. For this reason the secured position of the interconnecting interface on the shaft is predefined, and therefore there is no flexibility to adapt the secured position of the interconnecting device in the axial direction of the shaft in case that is desired. In addition a separate core is needed in the bore of the knob.

It is an object of the present invention to provide a knob assembly which allows to secure a knob on a shaft of a gearshift lever in a secure and flexible manner.

SUMMARY OF THE INVENTION AND ADVANTAGES

According to the invention at least two engagement members are disposed circumferentially distributed in an circumferential position pattern around the bore opening of the knob, and are axially extending away from the knob to be able to abut against surface portions of the shaft outside of the knob. The term axial refers to a direction parallel to the axis of the generally cylindrical bore of the knob, and radially refers to a direction perpendicular thereto. A locking ring is disposed concentrically to the knob to embrace the engagement members. This locking ring is provided with bulge regions of increased material thickness which are distributed around the circumference of the locking ring in an circumferential position pattern corresponding to the circumferential positions of the engaging members, i.e. the locking ring may be brought, by rotation, to a position in which the bulge regions are superimposed to or overlapping with the engaging members. Furthermore a compression ring is disposed concentrically around the locking ring in an abutting relationship with the bulge regions thereof. In this manner the compression ring is adapted to apply, when the locking ring is being rotated to bring its bulge regions into overlapping relationship with the engaging members, a restraining or counter-acting force to the bulge regions which in turn apply a compressing force to the engaging members to secure the knob assembly to the shaft by clamping or gripping engagement of the engaging members with the shaft. In this manner the knob assembly may be secured on the shaft in a safe and flexible manner, wherein the axial position of the connecting area on the shaft can be varied to adapt it to the currently required or desired position. In addition, the locking ring may be brought to a predetermined "locked" position in which the bulge regions of the locking ring are overlapping the engaging members, wherein possible tolerances of the components may be balanced or absorbed by elastic deformation of the locking and compression ring materials.

The locking ring is preferably made of hard plastic and the compression ring of spring steel. Rotation of the locking ring and movement of the bulge regions over the engaging members will cause a certain expansion of the compression ring which in turn creates the counter-force on the engaging members via the locking ring bulge regions.

In a preferred embodiment the engaging members are formed by circumferential wall segments of an imaginary tubular axial extension that is aligned with and continuing the bore of the knob, which circumferential segments are separated from each other in circumferential direction by gaps. A segment is defined to be a part of a cylinder wall cut out by two radius vectors having angle inbetween; for example a segment defined by two radius vectors at 90° to each other would be a quarter of a cylinder cut in two perpendicular planes through the axis of the cylindrical tube. The opening angle between the two radius vectors of the segment is herein also referred to as circumferential extension of the segment. By arranging the engaging members as extended cylinder wall segments continuing the bore of the knob, the radius and curvature of the inner surface of the engaging members corresponds to the curvature and radius of the bore, and therefore the engaging members are particularly well adapted to abut against surfaces portions of the shaft which is to be introduced into in the area surrounded by the engaging members and into the bore.

In a preferred embodiment the inner surfaces of the bulge regions and the outer surfaces of the engaging members are provided with cooperating, complementary shaped projections and depressions which are disposed such that the projections come into engagement with the depressions when the bulge regions, upon rotation of the locking ring, reach the intended overlapping position over the engaging members. Preferably each bulge region has an axially extending ridge on its inner surface, and the outer surface of the associated engaging members provided with axially extending, complementary shaped grooves which are disposed such that they come into engagement with the ridges of the bulge regions in the intended overlapping position of the bulge regions over the engaging members.

In a preferred embodiment the locking ring is provided with a tab extending beyond the ring portion and dimensioned such that it extends beyond the compressing ring to be accessible for engagement by a tool to rotate the locking ring. Preferably, the tab extends in the direction towards the bore and extends into an axial gap between the knob and the compressing ring.

Preferably, the outer surface of at least one engaging member is, in the end portion facing away from the bore, provided with a stopper projecting radially from the surface and adapted to engage an outer rim portion of the locking ring to prevent axial movements of the locking ring away from the bore.

In a preferred embodiment three engaging members are provided which are uniformly distributed around the circumference of the bore, wherein the circumferential extension of each engaging member is less than 90°.

In a preferred embodiment the knob assembly further comprises a cover member adapted to be pushed in axial direction towards the knob assembly to be secured thereon and to cover the compression ring, the locking ring and the axial gap up to the knob assembly.

In a preferred embodiment a gearshift lever comprising a shaft and a knob assembly as defined in the previous paragraphs for securing the knob assembly to an end portion of the shaft is provided. Preferably, the surface of the shaft is, in its upper end portion in which the engaging members come into abutment against said outer surface, provided with a roughened surface to enhance the engagement between the engaging members and said roughened surface when the bulge regions of the locking ring press onto engaging members to secure the knob assembly on the shaft.

BRIEF DESCRIPTION OF THE DRAWINGS

The invention will be described in the following in more detail with reference to exemplary embodiments illustrated in the drawings in which:

FIG. 1 shows a side view of a knob assembly in an unlocked state;

FIG. 2 shows a longitudinal section of the knob assembly of FIG. 1 taken along the line A-A of FIG. 1;

FIG. 3 shows a side view of the knob assembly as in FIG. 1 but in the locked state on the shaft;

FIG. 4 shows a longitudinal section of the knob assembly of FIG. 3 taken along the line A-A of FIG. 3;

FIG. 5 shows a side view of a knob assembly in the unlocked state;

FIG. 6 shows a cross-sectional view of the knob assembly of FIG. 5 taken along the line B-B of FIG. 5;

FIG. 7 shows a cross-sectional view of the knob assembly of FIG. 5 taken along the line C-C of FIG. 5;

FIG. 8 shows a side view of a knob assembly in the locked state;

FIG. 9 shows a cross-sectional of the knob assembly of FIG. 8 taken along the line B-B of FIG. 8;

FIG. 10 shows a cross-sectional view of the knob assembly of FIG. 8 taken along the line C-C of FIG. 8;

FIG. 11 shows a perspective partial view of the knob assembly on the shaft in the engagement region;

FIG. 12 shows an exploded view of the lever shaft and the knob assembly;

FIG. 13 shows a perspective view of the knob assembly in a preassembled state without a shaft.

DETAILED DESCRIPTION OF THE INVENTION

Figure 14:
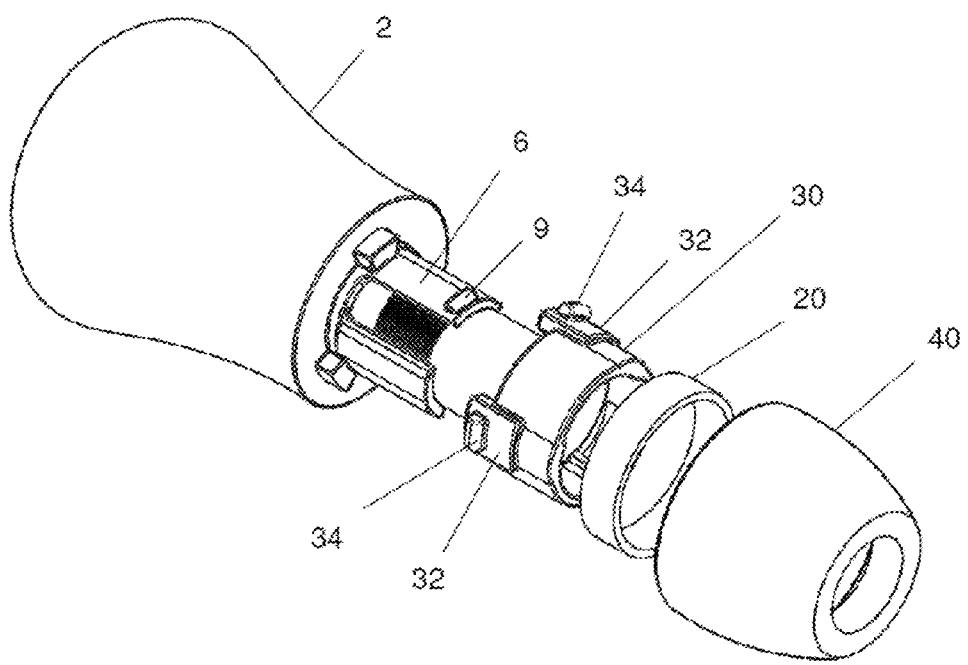
FIG. 14 shows an exploded view of the lever shaft and the knob assembly including a cover member.

In FIGS. 1 to 4 an embodiment of a knob assembly is illustrated, which knob assembly comprises a decorative knob 2 for a gearshift lever. An end portion of a shaft 4 is received in a cylindrical bore in the knob 2. The essentially cylindrical bore of the knob 2 is of complementary shape to the end portion of the shaft 4 so that a close fit of the end portion of the shaft 4 within the bore is achieved. The knob assembly further comprises engaging members 6 which are provided on the knob 2 and which are axial extensions (the term axial refers to a direction parallel to the central axis of the bore) circumferentially distributed around the bore opening of the knob. These engaging members 6 extend from the knob in a direction away from the knob 2 and are adapted to abut against surface portions of the shaft 4 outside of the bore of the knob 2.

The arrangement of the engaging members 6 can best be seen in FIG. 12 which shows an exploded view of the knob assembly. In this embodiment the engaging members 6 are formed as wall segments of a imaginary tubular extension which forms a continuation of the bore of the knob 2, i.e. a coaxial tubular extension of the bore with an inner diameter of the tubular extension corresponding to the inner diameter of the bore. As can be seen from FIG. 12 there is indeed a small tube portion 5 of the tubular extension which is followed by a portion in which only wall segments are left. In this embodiment there are three wall segments forming the engaging members 6 uniformly distributed in circumferential direction, i.e. the angle between the centres of two adjacent engaging members 6 is 120°. The tubular portion 5 and the following wall segment portions can be formed integrally with the knob 2, for example from plastic. Therefore, the engaging members 6 may have a certain elastic flexibility but preferably is of hard plastic material. When the engaging members 6 are formed as wall segments of a cylindrical extension of the bore it is ensured that the engaging members are in completely abutting relationship with surface portions of the shaft 4 when the latter is introduced through the region of the engaging members 6 into the bore of the knob 2. However, other designs of the engaging members are also possible in which the inner surfaces of the engaging members do not fully conform to the surface of the shaft.

A locking ring 30 is disposed concentrically around the engaging members 6 to embrace the engaging members 6. The locking ring 30 is made of a material that has a certain elastic flexibility; for example the locking ring may be made of hard plastic. As can be seen from a cross-sectional view such as in FIG. 6 the locking ring 30 has bulge regions 36 of increased material thickness. These bulge regions 36 may extend in axial direction along the locking ring.

A compression ring 20, for example made of spring steel, is concentrically placed around the locking ring 30 such that its inner surface is in abutting relationship with the bulge regions 36 of the compressing ring 20. Between the compression ring 20 and the knob 2 an axial gap is remaining into which parts of the locking ring 30 extend. In particular the locking ring 30 is provided with a tab 32 which axially extends towards the knob and which allows to engage the tab 32 using a tool in order to turn the locking ring 30 from a locked position to an unlocked position or vice versa. The tab 32 can be made of a different material than the locking ring, in particular the tab can be made of material having a higher stiffness to allow better engagement by a tool.

In the following it is described how the knob assembly is brought from an unlocked state (see FIGS. 5 to 7) to a locked state (see FIGS. 8 to 10). In FIGS. 5 to 7 the knob assembly is in the unlocked state. In the cross-sectional view of FIG. 6 it can be seen that in this unlocked state the engaging members 6 are not overlapping with the bulge regions 36 of the locking ring 30. In order to bring the knob assembly to the locked position the locking ring 30 is rotated in anti-clockwise direction to the position shown in FIG. 9. In this position the bulge regions 36 are overlapping or superimposed over the engaging members 6. The locking ring 30 and its bulge regions 36 are dimensioned such that in this position in which the bulge regions 36 overlap with the engaging members 6 the material of the locking ring in the bulge region 36 has to be compressed in order to fit into the space between the outer surface of the engaging member 6 and the inner surface of the compressing ring 30 which in turn is slightly expanded to create the counter-force on the bulge regions 36. The expansion of the compression ring and the compression of the material of the locking ring in the bulge regions 36 causes, since the compressing ring 20 is restraining the locking ring 30 from outside, a counter-acting compressing force acting on the engaging members 6 which in turn are pressed against the outer surface of the shaft 4. In this manner a clamping engagement between the engaging members 6 and the shaft 4 is achieved.

In order to keep the locking ring in its position when it has been brought to the locked position of FIGS. 8 to 10 the bulge regions 36 are provided with a ridge, a shoulder, or a projection 38 on the inner surface. In a corresponding manner depressions or grooves 7 are provided on the outer surface of the engaging members 6, wherein the ridges 38 and grooves 7 are positioned such that they come into an engagement when the bulge regions 36 are in the locked position overlapping with the engaging members 6 as shown in FIG. 9. Due to this engagement between the engaging members 6 and the bulge regions 36 in the locked position of FIG. 9 an undesired loosening of the knob assembly is prevented.

In order to open the knob assembly again a tool (not shown) may be used to engage with the tab 32 to rotate the locking ring 30 from the locked position as shown in FIG. 9 to the unlocked position as shown in FIG. 6 by rotation in clockwise direction (in the view of FIGS. 6 and 9). This rotation causes that the locking ring 30 with its bulge regions 36 is rotated from the position as shown in FIG. 9 to a position as shown in FIG. 6, with the bulge regions 36 out of the overlapping relationship with the engaging members 6, thereby releasing the compressing force on the engaging members 6 and releasing the engagement on the shaft 4.

FIGS. 10 and 7 show this transition from the locked position to the unlocked position in the cross-sectional view taken along the line C-C of FIG. 5 or 8. In these sectional views the locking ring is not visible in the ring portion but only in the region of the tabs 32 with the projections 34 in the gap between the compression ring 20 and the knob 2. In these sectional views of FIGS. 7 and 10 in addition the engaging members 6 can be seen as including flange segments 8 (see also FIG. 12) which are formed in the area where the engaging members 6 merge with the knob 2. These flange segments 8 on the one hand limit movement of the locking ring 30 closer to the knob 2 in axial direction. Furthermore, the flange segments 8 limit the rotational movement in the locked position of FIG. 10 so that the locking ring 30 can not be rotated further as into the locked position of FIG. 10 in which the tab 32 abuts against a flange segment 8.

In FIGS. 1 to 4 the transition from the unlocked state (FIGS. 1 and 2) to the locked state (FIGS. 3 and 4) can be seen on the movement of tab 32 and its projection 34. The movement of the bulge regions 36 into the gap between the engaging members 6 and the compression ring 20 can not be seen in the sectional views of FIGS. 2 and 4 since this movement of the bulge regions only has the consequence that more is moved and compressed into the gap between the outer surface of the engaging members 6 and the inner surface of the compression ring 20, whereas an the compression ring is expanded. The expansion of the compressing ring 20 causes a strong counter-force and causes an increased compression of the locking ring material and therefore the above described compressive force on the engaging members which is clamping them onto the surface of the shaft 4.

In order to increase the engagement between the engaging members 6 and the shaft 4 the surface of the shaft is provided with a structure, in particular a roughened surface structure (see FIG. 11) in the area where the engaging members are abutting the surface of the shaft. This roughened surface structure 10 can for example be a knurled region. This surface structure improves the engagement between the engaging members 6 and the shaft 4 when the engaging members 6 are pressed onto the outer surface of the shaft 4 in the area of the roughened surface structure 10.

As can also be seen in FIG. 11, the engaging members 6 are provided with a projection or stopper 9 close to their outer ends. These projections 9 are adapted to come into abutment against an outer rim portion of the locking ring 30 so as to limit axial movement of the locking ring 30 away from the knob 2. This arrangement is in particular relevant in the pre-assembled state of the knob assembly as shown in FIG. 13 in which all parts of the knob assembly are in place but the knob assembly is not yet secured on a shaft of a gearshift lever. In the view of FIG. 13 the locking ring 30 is in the unlocked position, i.e. bulge regions 36 are not overlapping with the engaging regions 6. This can be seen by the fact that the bulge regions 36 and the tab 32 are slightly rotated in clockwise direction as compared to the locked position of FIGS. 3-4 and FIGS. 8-10. In this state a pre-assembled knob assembly can be delivered to a manufacturing site where it has to be mounted on a shaft of a gearshift lever. For this purpose the shaft of the gearshift lever is introduced into the annular space defined by the engaging members 6 and further into the bore of the knob 2. When the shaft has reached its intended end position within the bore, a tool can be used to engage on the tab 32 of the locking ring 30. By turning the locking ring with the tool in anti-clockwise direction the entire locking ring 30 is turned, and the bulge regions 36 are brought in an overlying relationship with the engaging members 6. Since the compression ring is thereby slightly expanded this results in the compressing counter-force on the engaging members 6 since the bulge regions are restrained on the outside by the compressing ring 20 so that the resulting counter-force causes the compressing clamping force to lock the knob assembly on the shaft of the gearshift lever.

Figure 15:
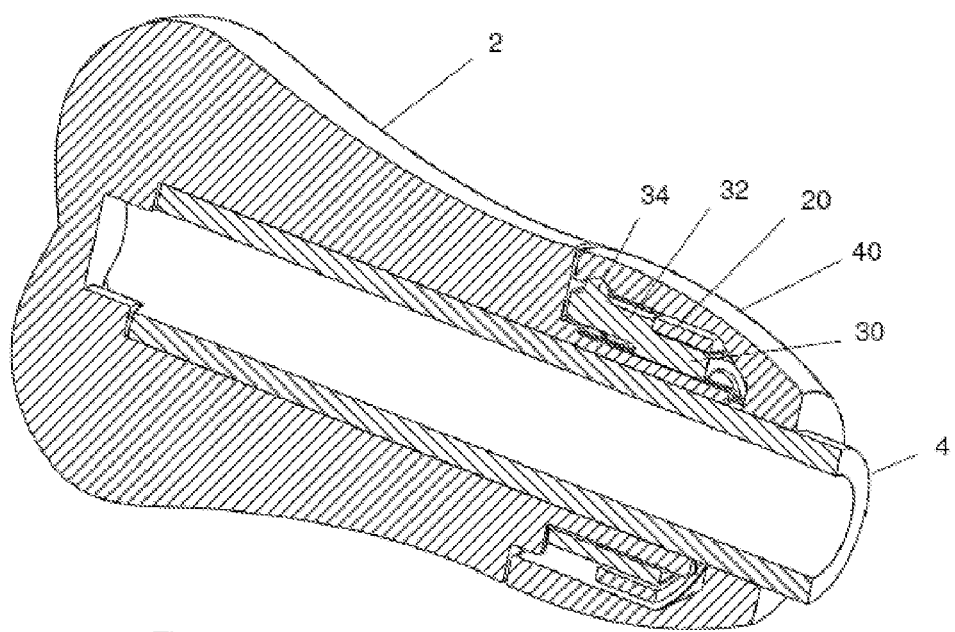
FIG. 15 shows a cross-sectional view of the embodiment of FIG. 14.

As can be seen in FIGS. 11 and 12 the tab 32 is provided with a projection 34 located in the axial gap between the compression ring 20 and the knob 2. This projection 34 is intended to cooperate with a recess in a lid or cover member 40 to form a snap-in connection for the cover or lid member 40 which is shown in FIGS. 14 and 15. Alternatively the projection can also cooperate with a groove structure on the knob which together form a bayonet coupling. This cover or lid member 40 is, after the knob assembly has been secured on the shaft, moved over the compression ring 20 and locking ring 30 to cover compression ring 20, the locking ring 20 and the axial gap between the compression ring 20 and the knob 2 and is secured there to cover the connecting portion between the knob and the gear shift lever 4.

The invention claimed is:

1. A knob assembly adapted to be secured to a top portion of a shaft (4) of a gearshift lever, the knob assembly comprising;
   a knob (2) having a generally cylindrical bore adapted to fit over an end portion of the shaft (4);
   engaging members (6) connected to the knob and adapted to engage the shaft for securing the knob on the shaft (4)

with at least two of the engaging members (6) being circumferentially distributed in an angular distance pattern around the bore of the knob and axially extending away from the knob to be able to abut surface portions of the shaft (4) outside of the knob (2);

a locking ring (30) embracing the engaging members (6) of the knob and having bulge regions (36) of increased material thickness which are distributed around a circumference of the locking ring in an angular distance pattern corresponding to the angular distance pattern of the engaging members (6), so that, by rotation of the locking ring, the locking ring may be brought to a position in which the bulge regions (36) overlap with the engaging members (6); and a compression ring (20) being concentrically positioned around and in an abutting relationship with the bulge regions (36) of the locking ring (30) to apply, when the locking ring is rotated to bring the bulge regions into overlapping relationship with the engaging members, a restraining force to the bulge regions which in turn apply a compressing force to the engaging members to secure the knob assembly to the shaft.

2. A knob assembly according to claim 1 wherein each of the engaging members (6) forms a circumferential wall segment aligned with and continuing with the bore of the knob (2), and the circumferential wall segments are separated from each other in a circumferential direction by gaps.

3. A knob assembly according to claim 1 wherein an inner surface of each of the bulge regions (36) is formed with a projection (38) and an outer surface of each of the engaging members (6) is provided with a depression (7), the projections and the depressions are disposed such that, when the locking ring is rotated to the position in which the bulge regions (36) overlap with the engaging members (6), the projections (38) come into engagement with the depressions (7).

4. A knob assembly according to claim 1 wherein the locking ring (30) is provided with a tab (32) extending beyond a ring portion of the locking ring such that the tab extends beyond the compression ring (20) so that the tab is accessible for engagement by a tool to rotate the locking ring (30).

5. A knob assembly according to claim 4 wherein the tab (32) extends towards the knob (2) and extends into an axial gap between the knob (2) and the compression ring (20).

6. A knob assembly according to claim 1 wherein an outer surface of at least one of the engaging members (6) is, in an end portion facing away from the knob (2), provided with a stopper (9) projecting radially from the outer surface and adapted to engage an outer rim portion of the locking ring (30) to prevent axial movement of the locking ring in a direction away from the knob.

7. A knob assembly according to claim 1 wherein three of the engaging members (6) are provided uniformly distributed around a circumference of the bore and that a circumferential extension of each of the engaging members is less than 90°.

8. A knob assembly according to claim 1 further comprising a cover member (40) adapted to be secured to the knob assembly and to cover the engaging members (6), the locking ring (30) and the compression ring (20) up to the knob (2).

9. A knob assembly according to claim 1 wherein each of the bulge regions (36) of the locking ring has an axially extending ridge (38) and an outer surface of each engaging member is provided with an axially extending, complementary shaped groove (7) which is disposed such that the grooves come into engagement with the ridges of the bulge regions (36) in the position in which the bulge regions overlap with the engaging members (6).

10. A gearshift lever comprising:
a shaft (4); and
a knob assembly comprising;
a knob (2) having a generally cylindrical bore adapted to fit over an end portion of the shaft (4),
engaging members (6) connected to the knob and adapted to engage the shaft for securing the knob on the shaft (4) with at least two of the engaging members (6) being circumferentially distributed in an angular distance pattern around the bore of the knob and axially extending away from the knob to be able to abut surface portions of the shaft (4) outside of the knob (2),
a locking ring (30) embracing the engaging members (6) of the knob and having bulge regions (36) of increased material thickness which are distributed around a circumference of the locking ring in an angular distance pattern corresponding to the angular distance pattern of the engaging members (6), so that, by rotation of the locking ring, the locking ring may be brought to a position in which the bulge regions (36) overlap with the engaging members (6), and
a compression ring (20) being concentrically positioned around and in an abutting relationship with the bulge regions (36) of the locking ring (30) to apply, when the locking ring is rotated to bring the bulge regions into overlapping relationship with the engaging members, a restraining force to the bulge regions which in turn apply a compressing force to the engaging members to secure the knob assembly to the shaft.

11. A gearshift lever according to claim 10 wherein an outer surface of the shaft (4) is, in its upper end portion in which the engaging members come into abutment against said outer surface, provided with a roughened surface (10) to enhance engagement between the engaging members (6) and said roughened surface (10) when the engaging members (6) are pressed onto said roughened surface to secure the knob assembly on the shaft (4).

12. A knob assembly according to claim 10 wherein each of the engaging members (6) forms a circumferential wall segment aligned with and continuing with the bore of the knob (2), and the circumferential wall segments are separated from each other in a circumferential direction by gaps.

13. A knob assembly according to claim 10 wherein each of the bulge regions (36) of the locking ring has an axially extending ridge (38) and an outer surface of each engaging member (6) is provided with an axially extending, complementary shaped groove (7) which is disposed such that the grooves come into engagement with the ridges of the bulge regions (36) in the position in which the bulge regions overlap with the engaging members (6).

14. A knob assembly according to claim 10 wherein an inner surface of each of the bulge regions (36) is formed with a projection (38) and an outer surface of each of the engaging members (6) is provided with a depression (7), the projections and the depressions are disposed such that, when the locking ring is rotated to the position in which the bulge regions (36) overlap with the engaging members (6), the projections (38) come into engagement with the depressions (7).

15. A gearshift lever according to claim 10 wherein the locking ring (30) is provided with a tab (32) extending beyond a ring portion of the locking ring such that the tab extends beyond the compression ring (20) so that the tab is accessible for engagement by a tool to rotate the locking ring (30).

16. A gearshift lever according to claim 15 wherein the tab (32) extends towards the knob (2) and extends into an axial gap between the knob (2) and the compression ring (20).

17. A gearshift lever according to claim 10 wherein an outer surface of at least one of the engaging members (6) is, in an end portion facing away from the knob (2), provided with a stopper (9) projecting radially from the outer surface and adapted to engage an outer rim portion of the locking ring (30) to prevent axial movement of the locking ring in a direction away from the knob.

18. A gearshift lever according to claim 10 wherein three of the engaging members (6) are provided uniformly distributed around a circumference of the bore and that a circumferential extension of each of the engaging members is less than 90°.

19. A gearshift lever according to claim 10 further comprising a cover member (40) adapted to be secured to the knob assembly and to cover the engaging members (6), the locking ring (30) and the compression ring (20) up to the knob (2).

* * * * *